J. C. W. WEBER.
VALVE.
APPLICATION FILED APR. 12, 1915.
1,191,376.
Patented July 18, 1916.
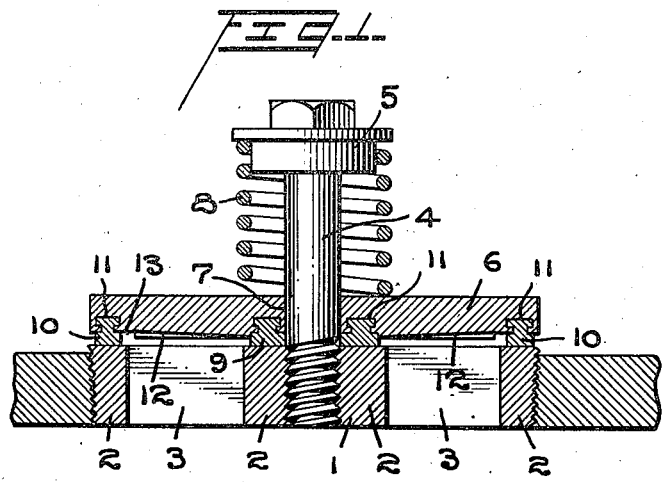
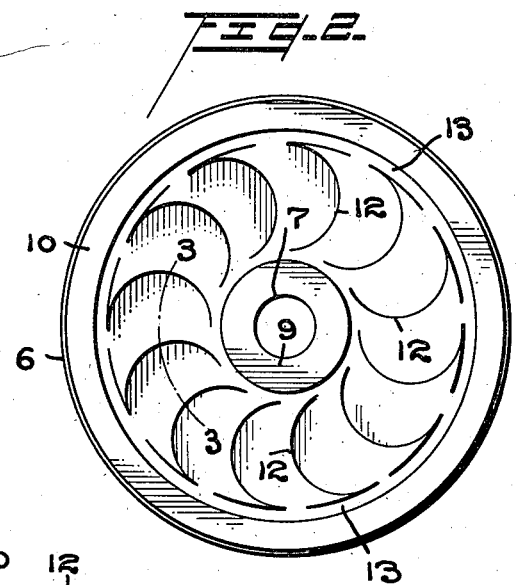
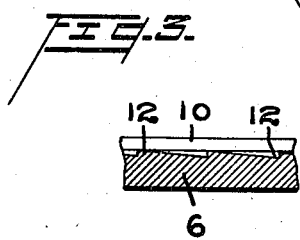
Witnesses
Inventor
Johan C. W. Weber
By Joshua R. H. Potts.
Attorney

UNITED STATES PATENT OFFICE.

JOHAN C. W. WEBER, OF PHILADELPHIA, PENNSYLVANIA.

VALVE.

1,191,376.                Specification of Letters Patent.    Patented July 18, 1916.

Application filed April 12, 1915. Serial No. 20,871.

*To all whom it may concern:*

Be it known that I, JOHAN C. W. WEBER, a citizen of the United States, residing at Philadelphia, in the county of Philadelphia and State of Pennsylvania, have invented certain new and useful Improvements in Valves, of which the following is a specification.

My invention relates to improvements in valves, and more particularly to that character of valve known to the trade as "puppet valve", the object of the invention being to provide a valve of the character stated with concentric ring faces engaging similar ring faces of the valve seat, and said valve so constructed that the pressure of water thereagainst as the valve is open, will compel the valve to turn slightly, and hence prevent the valve from continuously seating in the same position.

A further object is to provide a valve of the character stated which, at each opening movement, turns slightly, thus keeping the valve seat clean, compelling a uniform wear on the ring faces of the valve, and exerting a more or less grinding action of the valve faces so as to compel the same to wear uniformly and maintain a tight closure.

A further object is to provide a valve of the character stated with a circular series of curved vanes integral with the lower face of the valve, and compelling the valve to turn by the pressure of the water as the water rushes past the valve when the latter is open.

With these and other objects in view, the invention consists in certain novel features of construction and combinations and arrangements of parts as will be more fully hereinafter described and pointed out in the claims.

In the accompanying drawings, Figure 1 is a view in vertical section illustrating my improved valve. Fig. 2 is a face view of the valve, and Fig. 3 is a fragmentary view in section on the curved line 3—3 of Fig. 2.

1 represents a valve seat having concentric rings 2 connected by webs 3.

4 is the ordinary valve stem having a head
5 at its upper end, and 6 is my improved valve having an opening 7 to receive and move upon the stem 4, and said valve is normally pressed against the seat by a coiled spring 8 located between head 5 and the valve 6.

The valve 6 is provided on its lower face with concentric rings 9 and 10, said rings preferably composed of a metal or material differing from the metal of the valve and having dove-tailed juncture with the valve as shown at 11. Between the rings 9 and 10 which constitute the bearing faces of the valve, said valve is provided with a circular series of curved vanes 12, all of which communicate at their outer ends with a passage 13 concentric with and adjacent the outer ring 10. These vanes 12 are integral with the valve 6, and they are cast, pressed, or otherwise formed in the metal valve, and not only curve in the arc of a circle from their inner to their outer ends, but are shallowest at their inner end and gradually increase in width or depth to their outer ends. By thus constructing the blades or vanes, the water as it is forced outwardly when the valve is opened, exerts a pressure on the vanes 12 to compel the valve to turn, and while this turning movement may be slight, it is sufficient to compel the valve to continuously change its position and prevent reseating at the same point on the valve seat.

As shown most clearly in Fig. 3, it will be noted that the bottom surface of the valve inclines from the lowest point of one vane to the highest point of the other, and by reference particularly to Fig. 1, it will be noted that the vanes increase in thickness or depth from their inner to their outer ends at which latter point they discharge into the annular passage 13.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A valve of the character described, having on its under face concentric valve faces, and between said valve faces having a circular series of blades or vanes, said blades or vanes curved in the arc of a circle and increasing in depth from their inner to their outer ends, substantially as described.

2. A valve of the character described, having on its under face concentric valve faces, and between said valve faces having a circular series of blades or vanes, said blades or vanes curved in the arc of a circle and increasing in depth from their inner to their outer ends, and said valve having an annular passage communicating with the outer ends of all of the blades or vanes, substantially as described.

3. A valve of the character described, having on its under face concentric valve faces, and between said valve faces having a circular series of blades or vanes, said blades or vanes curved in the arc of a circle and increasing in depth from their inner to their outer ends, said valve faces projecting in a plane below the blades or vanes, substantially as described.

In testimony whereof I have signed my name to this specification in the presence of two subscribing witnesses.

JOHAN C. W. WEBER.

Witnesses:
C. R. ZIEGLER,
S. W. FOSTER.